United States Patent [19]

Kaveh et al.

[11] Patent Number: 4,917,715
[45] Date of Patent: Apr. 17, 1990

[54] METHOD FOR PRODUCING ROTARY TEXTILE FIBERS

[75] Inventors: Farrokh Kaveh, Worthington; David C. K. Lin, Newark, both of Ohio

[73] Assignee: Owens-Corning Fiberglas Corporation, Toledo, Ohio

[21] Appl. No.: 290,117

[22] Filed: Dec. 27, 1988

[51] Int. Cl.$^4$ .................. C03B 37/04; C03B 27/02
[52] U.S. Cl. .................................. 65/6; 65/12; 65/3.1
[58] Field of Search ............. 65/2, 6, 8, 12, 14, 65/15, 3.1

[56] References Cited

U.S. PATENT DOCUMENTS

| | | | |
|---|---|---|---|
| 3,149,944 | 9/1964 | Leaman | 65/8 X |
| 3,161,920 | 12/1964 | Stalego | 65/2 X |
| 3,347,648 | 10/1967 | Krakauer et al. | 65/6 X |
| 3,644,108 | 2/1972 | Russell | 65/12 X |
| 3,649,234 | 3/1972 | Charpentier | 65/6 |
| 3,775,076 | 12/1973 | Pallo | 65/12 |
| 3,877,911 | 4/1975 | Borst | 65/6 X |
| 4,274,855 | 6/1981 | Russell | 65/2 |
| 4,353,724 | 10/1982 | Houston | 65/8 |
| 4,468,241 | 8/1984 | Breidenthal, Jr. | 65/6 X |
| 4,578,098 | 3/1986 | Paek et al. | 65/12 X |
| 4,594,088 | 6/1986 | Paek et al. | 65/2 X |
| 4,601,742 | 7/1986 | Kaveh | 65/14 |
| 4,620,859 | 11/1986 | Lin et al. | 65/2 |
| 4,622,054 | 11/1986 | Huey et al. | 65/2 |
| 4,627,868 | 12/1986 | Kaveh | 65/6 |
| 4,636,234 | 1/1987 | Huey et al. | 65/2 |
| 4,668,267 | 5/1987 | Savary | 65/12 X |

*Primary Examiner*—Robert L. Lindsay
*Attorney, Agent, or Firm*—Patrick P. Pacella; Richard D. Emch; Ted C. Gillespie

[57] ABSTRACT

A method of making textile glass fibers in a rotary process is disclosed. A spinner bearing molten glass rotates on its axis of rotation. Glass is forced through orifices and the resulting fibers are moved along paths generally perpendicular to the axis of rotation. Prior to commingling or turn down of the fibers a quenching liquid is applied to the fibers.

11 Claims, 2 Drawing Sheets

METHOD FOR PRODUCING ROTARY TEXTILE FIBERS

TECHNICAL FIELD

This invention relates to the production of mineral fibers and, more specifically, to producing textile glass fibers, by a rotary process.

BACKGROUND OF THE INVENTION

A common prior art method for forming glass fibers for use in wool products, such as insulation materials, is the use of a rotary process. Glass in its molten state is forced through the orifices in the peripheral wall of a centrifuge or spinner to create streams of molten glass. Thereafter, the streams are further attenuated into glass fibers of smaller diameter by the action of gases discharged downwardly in an annular or cylindrically shaped gaseous flow circumferentially positioned relative to the spinner. Some prior art rotary processes use an annular combustion chamber positioned around the spinner to produce high temperature, high velocity, gases of combustion which are discharged downwardly in a circumferential flow. In other prior art methods, air or steam blowers are utilized either alone or in combination with burners to provide a downward or pulling force.

Krakauer et al. U.S. Pat. No. 3,347,648 discloses the use of a water spray after attenuation and commingling of the filaments to accelerate cooling the filaments whereby resin or binder may be applied sooner. Contrary to the present invention, the rotary process disclosed in Krakauer et al. uses a high velocity, high temperature external burner positioned to discharge a hot high temperature gaseous blast downwardly closely adjacent the spinner to attenuate the glass fibers. The Krakauer et al. water supply pipe applies water to the fibers after they have turned down and fiber commingling has occurred.

Textile fibers are generally longer and stronger than wool fibers produced by prior art rotary processes. For the purposes of this invention, textile fibers are fibers of sufficient length and strength to be used in textile materials, for reinforcing purposes in fiber reinforced plastics and as reinforcing fibers in such products as roofing shingles.

After the longer length textile fibers are manufactured they often are cut into shorter lengths for certain reinforcing applications.

In a prior art rotary process, where rotary glass fibers are manufactured for non-textile applications, the tensile strength of the glass fibers is normally considerably lower than 50,000 p.s.i. (35.1 kg/sq. mm.). Textile fibers should have tensile strengths of 150,000 p.s.i. (105.3 kg/sq. mm.) and preferably 300,000 p.s.i. (210.7 kg/sq. mm.).

Attempts have also been made in the prior art to produce textile fibers by the rotary process. The high fiber production rate of a rotary process is much greater than the fiber production rates of non-rotary processes. One prior art attempt at a rotary process is shown in U.S. Pat. No. 3,900,302. These prior art attempts to form textile glass fibers by the rotary process have not, to the knowledge of the present inventors, been successful. Accordingly, the primary purpose of the present invention is to form satisfactory textile mineral fibers, such as textile glass fibers, by a rotary process.

SUMMARY OF THE INVENTION

The present invention is directed to a method of making glass fibers in a rotary process. The glass fibers are textile fibers for use in textile applications including FRP products and roofing shingle products. The textile glass fibers, according to the present invention, are produced by using a rotary centrifuge having peripheral walls defining a plurality of orifices. The centrifuge spins on its axis of rotation. The steps include discharging and attenuating streams of molten glass fibers from the rotary centrifuge along paths generally perpendicular to the axis of rotation of the centrifuge. The glass fibers are turned downwardly normally by the use of a cylindrically shaped gaseous stream. Prior to such turning and/or the general commingling of the glass fibers, the fibers are quenched by the application of a liquid.

In a preferred method, sizing is applied to the glass fibers either during or subsequent to the quenching step.

DESCRIPTION OF THE PREFERRED EMBODIMENTS

Figure 2:
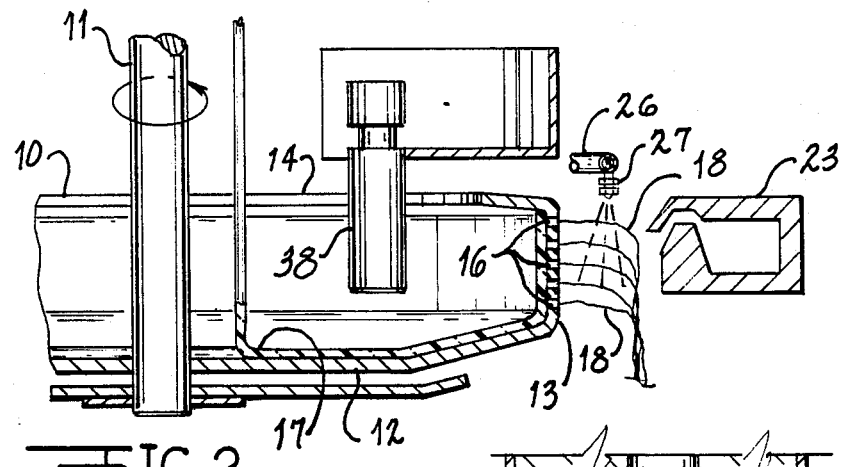
FIG. 2 is a schematic view in elevation of one embodiment of apparatus for making rotary textile glass fibers, according to the present invention.

As shown in FIG. 2, a spinner or centrifuge 10 is mounted for rotation on a quill 11. The spinner 10 includes a bottom wall 12 and a peripheral wall 13 integrally connected to a ring-shaped top wall 14.

Figure 1:
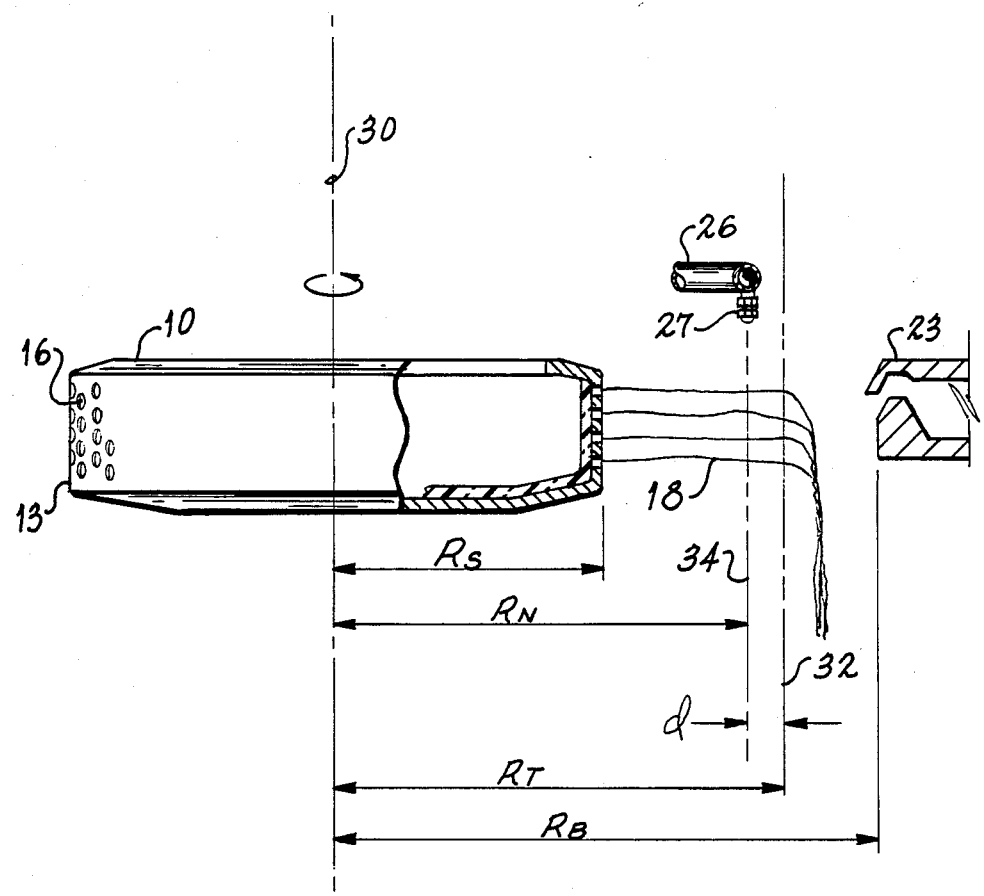
FIG. 1 is a diagrammatic elevational view partially in cross-section, showing the rotary centrifuge discharging streams of glass fibers and the quenching of the fibers by the application of a liquid, according to the present invention.

The peripheral wall 13 defines a plurality of orifices 16. A molten stream of glass 17 enters the spinner 10 and is forced outwardly against the peripheral wall 13 by centrifugal force. The molten glass passes through the orifices 16 to form fibers 18. The glass passing through the orifices 16 is maintained in a plastic, attenuable condition by heat supplied by a plurality of internal burners 38. Positioned exteriorly of the spinner 10 and located circumferentially around the peripheral wall of the spinner 10 is a high pressure annular blower 23 for providing additional attenuation forces on the fibers by forcing high velocity, high pressure, air downwardly. A quenching ring 26 surrounds the spinner and is preferably concentrically located with respect to the blower 23. The quenching ring 26 through its nozzles 27 discharges a stream of quenching liquid downwardly to engage the fibers 18 prior to a time that they have commingled and are turned by the forces generated by the annular blower 23. Referring to FIG. 1, an immaginery cylinder 34 defined by the center of the spray path emitted from the circumferentially mounted nozzles 27 is positioned an incremental distance "d" from an immaginery cylinder of rotation 32 which is the point or plurality of points where the attenuating fibers begin their downward movement.

Referring to FIG. 1, the immaginery cylinder of rotation 32 has a radius $R_T$. The spinner 10 has a radius $R_S$, while the quench ring 26 has a radius $R_N$. The annular blower 23 has an exit which defines a radius $R_B$ with the axis of rotation 30 of the spinner 10.

In a preferred spacing, if $R_S=7.5$ inches (19 c.m.) $R_N$ is between 7.75 inches (19.7 c.m.) and 8.5 inches (21.6 c.m.), while $R_B$ is 8.75 inches (22.2 c.m.); and the difference between $R_B$ and $R_N$ is 0.25 inches (0.64 c.m.) to 1.0 inch (2.54 c.m.).

The quenching liquid applied by the quenching ring 26 is localized between the wall 13 of the spinner 10 and the blower 23 such that the liquid does not strike the spinner wall 13 but is applied prior to the commingling and/or the turndown of the fibers 18 at $R_T$. The quenching liquid is applied exterior of the centrifuge and at a position to temper the fibers into high strength textile fibers. Preferably the radius $R_T$ is close in dimension to the radius $R_B$ and in practice it has been found to be preferable to have $R_T$ approximately 0.0625 of an inch (0.16 c.m.) smaller than $R_B$.

The immaginery cylinder of rotation 32 indicates generally where the attenuating fibers 18 begin their downward movement.

A sizing can be applied to the fibers 18 with quenching liquid or at a position below the spinner 10.

A typical size which may be utilized comprises a film former, a dispersing agent, a lubricant and a silane. More specifically the following compositions may be used:

| | |
|---|---|
| Film Former | Vinyl 205 manufactured by Air Products |
| Dispersing Agent | Fatty Acid Amine Reaction Product |
| Lubricant | Emery 7440 (a mineral Oil Dispersion) manufactured by Emery |
| Silane | A-1100 (Ammino Silane) manufactured by Union Carbide. |

While the above size compositions may be utilized, it is understood that the textile rotary process described herein is not limited to the specific size disclosed above.

A quenching liquid must be used as opposed to a quenching fluid gas. The quenching liquid which essentially is water or water with an additive, such as the sizing, has sufficient BTU's of cooling to sufficiently quench the fibers prior to the drag forces of the blower 23 pulling and commingling the fibers as they attenuate.

While it is not completely understood why the quenching liquid application allows the production of textile quality fibers by a rotary process, it is felt that the quench provides a rapid cooling of the fibers at a desired location before turndown and/or commingling. By using such a process, the inventors have been able to produce textile glass fibers by a rotary process of sufficient lengths and strengths for commercial or industrial uses.

As the term "commingling" is used in the present specification and claims, it means the location in the fiber path where a large number of fibers engage or commingle with one another. This location is normally immediately before or at the turn down of the fibers where they turn from a path perpendicular to the axis of rotation of the spinner to a path generally parallel to the axis of rotation. The term "commingling" as used in the present specification and claims does not include the touching of small numbers of random fibers which occurs throughout the process beginning immediately after the fibers are formed at the peripheral wall of the spinner.

In the present embodiments, quenching liquid is applied to the glass fibers in the range of 0.2 to 1.2 lbs. of water (0.09 kg. to 0.54 kg. of water) to 1 lb. of glass (0.45 kg. of glass). A preferable range of quenching liquid is 0.6 to 0.7 lbs. of water (0.27 kg. to 0.32 kg. of water) to 1 lb. of glass (0.45 kg. of glass).

Referring to FIG. 1, which is a diagrammatic view, the spinner 10 includes an axis 30 which is the center of rotation of the spinner. While the peripheral wall 13 is shown as generally parallel to the axis 30 it is understood that the peripheral wall 13 may be angled and still fall within the scope of the present invention. The cylinder of rotation 32 has the axis 30 as its axis and indicates the point where the attenuating fibers 18 generally begin their downward motion. The nozzles 27 are positioned in a ring and define the immaginery cylindrical surface 34 which is the center of the cylinder of quenching liquid supplied through the quenching ring 26. The quenching liquid cylinder 34 is concentric with and spaced inwardly from the cylinder of rotation 32 by a predetermined or incremental distance "d" as shown in FIG. 1. It has been found that it is most important that the quenching liquid be applied to the primary fibers 18 prior to the time that they reach the cylinder of rotation 32 and prior to turndown.

Figure 3:
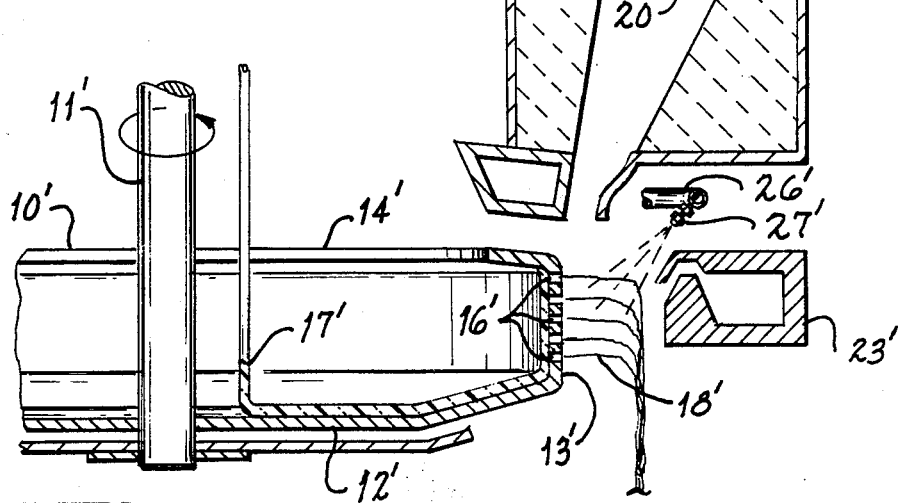
FIG. 3 is a view similar to FIG. 2 showing another embodiment of apparatus for making rotary textile glass fibers, using an external annular burner, according to the present invention.

Referring to FIG. 3, another embodiment of apparatus for fiberizing molten mineral material is shown. A spinner 10' is mounted for rotation on a quill 11'. The spinner 10' includes a bottom wall 12', a peripheral wall 13' and a top wall 14'. A plurality of orifices 16' are defined by the peripheral wall 13'.

A molten glass stream 17' enters the spinner 10' and is forced outwardly against the peripheral wall 13' by centrifugal force. The molten glass passes through the orifices 16' to form glass fibers 18'.

An annular burner 20 maintains the glass fibers 18' in a plastic attenuable condition. The annular burner 20 is an exterior burner and in the present embodiment is mounted above and slightly outside of the peripheral wall 13' of the spinner 10'. As shown, the burner 20 has a rather open throat and the gases passing from the burner have a low velocity. The velocity of the gases from the burner 20 is insufficient to actually attenuate the glass fibers 18' issuing from the spinner 10'. This is in contrast to other prior art burners which use high velocity gases for the purpose of attenuating the fibers. The glass fibers 18' are further attenuated by the action of high velocity gases discharged from an annular blower 23'.

While temperature conditions vary, the temperature of the molten glass within the spinners 10 and 10' would approximate 1900° F. (1038° C.). Generally the temperature of the molten glass within the spinner 10' will fall within a range of 1500° F. and 2400° F. (816° C. and 1316° C.).

In the embodiment shown in FIG. 3, the annular burner 20 is a low velocity burner which maintains the heat in the attenuating glass fibers while the drag or attenuating forces are created by the annular blower 23. Under this process, a quenching ring 26' having a plurality of downwardly positioned nozzles 27' applies a quenching liquid, indicated by dashed lines in FIG. 3, to the fibers after they leave the spinner 10' and prior to the time that they commingle or are turned downwardly by the attenuating blower 23'. At the point that the quenching liquid is applied, as shown in FIG. 3, the attenuation has occurred because of the centrifugal forces generated by the spinner 10' and because of the downward pull created by the blower 23; and the attenuation is not, for example, the result of a high velocity external burner (not shown) which would commingle the fibers and prevent the desired affect of the quenching liquid.

Many changes may be made to the above described apparatus and methods without departing from the following claims.

We claim:

1. A method of making glass fibers in a rotary centrifuge having a peripheral wall, a plurality of orifices in such wall and an axis of rotation, comprising the steps of discharging and attenuating streams of molten glass fibers from the rotary centrifuge along paths generally perpendicular to such axis of rotation, turning the glass fibers down in a direction generally parallel to such axis of rotation and prior to such turning down quenching said fibers at a location exterior of the centrifuge, at a position to temper the fibers into high strength textile fibers, by the application of a quenching liquid while such fibers are in paths generally perpendicular to such axis of rotation, wherein such quenching liquid is applied in the range of 0.2 lb. to 1.2 lb. (0.09 kg. to 0.54 kg. of liquid) to 1 lb. of glass (0.45 kg of glass).

2. A method of making glass fibers, according to claim 1, wherein such glass fibers are attenuated solely by forces generated by centrifugal forces.

3. A method of making glass fibers, according to claim 1, wherein such glass fibers are attenuated solely by forces generated by centrifugal forces and an annular blower.

4. A method of making glass fibers, according to claim 1, wherein such glass fibers are attenuated solely by centrifugal forces and by forces generated by a concentrically located blower.

5. A method of making glass fibers, according to claim 1, wherein no attenuation occurs through the use of a high velocity external burner or burners.

6. A method of making glass fibers, according to claim 1, wherein said fibers turn downwardly along a path generally defined by a cylinder of rotation parallel to such axis of rotation, such quenching liquid being applied in a generally concentric ring spaced inwardly a predetermined distance from such cylinder of rotation.

7. A method of making glass fibers, according to claim 1, wherein the quenching liquid comprises water.

8. A method of making glass fibers, according to claim 1, wherein such quenching liquid is water and is applied in the range of 0.6 lb. to 0.7 lb. of water (0.27 kg. to 0.32 kg of water) to 1 lb. of glass (0.45 kg of glass).

9. A method of making glass fibers, according to claim 1, wherein a sizing composition is applied during quenching.

10. A method of making glass fibers, according to claim 1, wherein a sizing composition is applied after such fibers have turned downwardly.

11. A method of making glass fibers, according to claim 1, wherein the quenching liquid is applied prior to the commingling of the glass fibers.

* * * * *